United States Patent
Xu et al.

(10) Patent No.: US 11,811,057 B2
(45) Date of Patent: Nov. 7, 2023

(54) POSITIVE ELECTRODE SHEET, SECONDARY BATTERY, BATTERY MODULE, BATTERY PACK, AND ELECTRICAL APPARATUS

(71) Applicant: CONTEMPORARY AMPEREX TECHNOLOGY CO., LIMITED, Ningde (CN)

(72) Inventors: Baoyun Xu, Ningde (CN); Shaocong Ouyang, Ningde (CN); Chenghua Fu, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 0 days.

(21) Appl. No.: 18/331,696

(22) Filed: Jun. 8, 2023

(65) Prior Publication Data
US 2023/0317933 A1 Oct. 5, 2023

Related U.S. Application Data

(63) Continuation of application No. PCT/CN2022/094695, filed on May 24, 2022.

(30) Foreign Application Priority Data

Sep. 30, 2021 (CN) .......................... 202111159354.7

(51) Int. Cl.
| | |
|---|---|
| H01M 4/36 | (2006.01) |
| H01M 4/587 | (2010.01) |
| H01M 4/62 | (2006.01) |
| H01M 4/38 | (2006.01) |
| H01M 4/134 | (2010.01) |
| H01M 4/133 | (2010.01) |
| H01M 4/02 | (2006.01) |

(52) U.S. Cl.
CPC ........... *H01M 4/366* (2013.01); *H01M 4/133* (2013.01); *H01M 4/134* (2013.01); *H01M 4/386* (2013.01); *H01M 4/587* (2013.01); *H01M 4/625* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 8,785,079 B1* | 7/2014 | Gross | ................... | H01M 4/661 |
| | | | | 429/534 |
| 2004/0043291 A1* | 3/2004 | Kim | .................. | H01M 10/0587 |
| | | | | 429/232 |
| 2012/0300364 A1* | 11/2012 | Cai | ....................... | H01M 4/587 |
| | | | | 264/29.1 |

FOREIGN PATENT DOCUMENTS

| | | |
|---|---|---|
| CN | 103855394 A | 6/2014 |
| CN | 104241680 A | 12/2014 |
| CN | 106463696 A | 2/2017 |
| CN | 106848284 A | 6/2017 |
| CN | 107925057 A | 4/2018 |
| CN | 107994206 A | 5/2018 |
| CN | 109037587 B | 11/2020 |
| CN | 110676428 B | 12/2020 |
| CN | 112259723 A | 1/2021 |
| EP | 3 370 278 * | 9/2018 |
| TW | 201332187 * | 8/2013 |
| TW | 201442324 * | 11/2014 |
| WO | 0241417 A1 | 5/2002 |

OTHER PUBLICATIONS

Machine translation of TW 201332187, published on Aug. 1, 2013 (Year: 2013).*
Machine translation of TW 201442324, published on Nov. 1, 2014 (Year: 2014).*
The World Intellectual Property Organization (WIPO) International Search Report and Written Opinion for PCT/CN2022/094695 dated Jul. 27, 2022 17 pages (including English translation).

* cited by examiner

*Primary Examiner* — Anca Eoff
(74) *Attorney, Agent, or Firm* — ANOVA LAW GROUP, PLLC

(57) ABSTRACT

A positive electrode sheet includes a positive electrode current collector and a positive electrode active material layer coated on at least one surface of the positive electrode current collector. The positive electrode active material layer includes an inner active material layer and an outer active material layer successively stacked. The inner active material layer has a three-level pore size distribution: an inner primary pore size distribution from 3 nm to 10 nm, an inner secondary pore size distribution from 10 nm to 100 nm, and an inner tertiary pore size distribution from 0.1 μm to 2 μm. The outer active material layer has a three-level pore size distribution: an outer primary pore size distribution from 0.5 nm to 3 nm, an outer secondary pore size distribution from 10 nm to 100 nm, and an outer tertiary pore size distribution from 0.1 μm to 2 μm.

11 Claims, 4 Drawing Sheets

POSITIVE ELECTRODE SHEET, SECONDARY BATTERY, BATTERY MODULE, BATTERY PACK, AND ELECTRICAL APPARATUS

CROSS-REFERENCE TO RELATED APPLICATIONS

The present application is a continuation of International Application No. PCT/CN2022/094695, filed on May 24, 2022, which claims priority to Chinese Patent Application No. 202111159354.7 filed on 30 Sep. 2021 and entitled "POSITIVE ELECTRODE SHEET, SECONDARY BATTERY, BATTERY MODULE, BATTERY PACK, AND ELECTRICAL APPARATUS," the entire contents of which are incorporated herein by reference.

TECHNICAL FIELD

The present application relates to the field of batteries, and specifically relates to a positive electrode sheet, a secondary battery, a battery module, a battery pack, and an electrical apparatus.

BACKGROUND ART

With the rapid development of the application of secondary batteries in electric vehicles and military field, a defect that low-temperature performance thereof fails to adapt to special low-temperature weather or extreme environments has attracted increasingly more attention. Under low-temperature conditions, both effective discharge capacity and effective discharge amount of a secondary battery will be obviously reduced, and its charge performance is extremely poor in an environment at below −10° C., thereby seriously restricting application of the secondary battery.

The secondary battery is mainly composed by a positive electrode sheet, a negative electrode sheet, a separator, and an electrolyte solution. The secondary battery in a low-temperature environment has characteristics of low discharge voltage platform, low discharge capacity, quick capacity attenuation, poor rate performance, and the like. Low-temperature performance restricts the application of the secondary batteries in the field of electric vehicles, military field, and extreme environments. Therefore, development of a secondary battery with outstanding low-temperature performance is an urgent market demand.

SUMMARY

In view of the problems existing in the Background Art, the present application provides a positive electrode sheet, a secondary battery, a battery module, a battery pack, and an electrical apparatus.

In a first aspect, the present application provides a positive electrode sheet, comprising a positive electrode current collector and a positive electrode active material layer coated on at least one surface of the positive electrode current collector. The positive electrode active material layer successively comprises an inner active material layer stacked on a surface of the positive electrode current collector and an outer active material layer stacked on a surface of the inner active material layer.

The inner active material layer has a three-level pore size distribution: an inner primary pore size distribution from 3 nm to 10 nm, and optionally from 6 nm to 10 nm; an inner secondary pore size distribution from 10 nm to 100 nm, and optionally from 10 nm to 84 nm; and an inner tertiary pore size distribution from 0.1 µm to 2 µm, and optionally from 0.1 µm to 1.26 µm.

The outer active material layer has a three-level pore size distribution: an outer primary pore size distribution from 0.5 nm to 3 nm, and optionally from 1 nm to 3 nm; an outer secondary pore size distribution from 10 nm to 100 nm, and optionally from 60 nm to 100 nm; and an outer tertiary pore size distribution from 0.1 µm to 2 µm, and optionally from 0.45 µm to 2 µm.

Compared with the related art, the active material layer of the positive electrode sheet provided in the present application has characteristics of a bilayered three-level pore size distribution. Under the premise that mass and energy density of the positive electrode active material are not reduced, such a bilayered three-level pore size distribution not only guarantees lithium-ion transport capacity of micropores in the active material layer, but also achieves consistent lithium-ion transport capacity in the inner active material layer and the outer active material layer. At the same time, the pore size distribution in the inner active material layer and the outer active material layer is reasonable, thereby avoiding space occupying effects and filling effects, further avoiding or reducing sharp decline of internal lithium-ion transport capacity of the secondary battery in a low-temperature environment, and significantly improving low-temperature charge-discharge performance of the secondary battery.

In some optional embodiments, the inner active material layer comprises an inner conductive agent and an inner active material, and the outer active material layer comprises an outer conductive agent and an outer active material.

The primary pore size distribution in the inner active material layer and the outer active material layer can be formed by selecting a conductive agent particle with an appropriate specific surface area.

A specific surface area of the inner conductive agent is from 300 m$^2$/g to 1,000 m$^2$/g, and optionally, the specific surface area of the inner conductive agent is from 800 m$^2$/g to 1,000 m$^2$/g.

A specific surface area of the outer conductive agent is from 1,000 m$^2$/g to 2,500 m$^2$/g, and optionally, the specific surface area of the outer conductive agent is from 2,000 m$^2$/g to 2,500 m$^2$/g.

In some optional embodiments, the secondary pore size distribution and the tertiary pore size distribution in the inner active material layer and the outer active material layer can be formed by selecting a mixture of active material particles with bimodal particle size.

In some optional embodiments, a particle size distribution of the inner first active material is from 24 nm to 600 nm, and optionally, the particle size distribution of the inner first active material is from 24 nm to 200 nm; and a particle size distribution of the inner second active material is from 0.25 µm to 13 µm, and optionally, the particle size distribution of the inner second active material is from 0.5 µm to 3 µm.

A particle size distribution of the outer first active material is from 24 nm to 600 nm, and optionally, the particle size distribution of the outer first active material is from 200 nm to 400 nm; and a particle size distribution of the outer second active material is from 0.25 µm to 13 µm, and optionally, the particle size distribution of the outer second active material is from 3 µm to 8 µm.

In some optional embodiments, a particle size of the inner first active material does not overlap with the inner tertiary pore size; and/or a particle size of the outer first active material does not overlap with the outer tertiary pore size.

That is, a particle size of an active material forming the secondary pore size in the inner layer and the outer layer is not equal to the tertiary pore size, thereby avoiding space occupying effects of first active material particles.

In some optional embodiments, a mass ratio of the inner first active material to the inner second active material is (0.3-3):1. Optionally, the mass ratio of the inner first active material to the inner second active material is (1-3):1.

In some optional embodiments, a mass ratio of the outer first active material to the outer second active material is (0.3-3):1. Optionally, the mass ratio of the outer first active material to the outer second active material is (0.3-1):1.

In the inner active material layer and the outer active material layer, when a mass of the first active material and a mass of the second active material are within the above range, a lamination density of the active material layer and an internal lithium-ion transmission path in the active material are at a favorable level, thereby guaranteeing energy density and kinetic performance of the secondary battery in the low-temperature environment.

In some optional embodiments, a mass ratio of the inner conductive agent to the inner active material is (0.3-2):100. Optionally, the mass ratio of the inner conductive agent to the inner active material is (1.5-2):100.

Optionally, a mass ratio of the outer conductive agent to the outer active material is (0.3-3):100. Optionally, the mass ratio of the outer conductive agent to the outer active material is (2.5-3):100.

The mass ratio of the conductive agent to the active material in the inner active material layer and the outer active material layer is kept within an appropriate range, such that conductivity and kinetic performance of the electrode sheet and energy density of the secondary battery can be kept within a favorable range.

In some optional embodiments, the inner conductive agent and the outer conductive agent are each independently selected from activated carbon or carbon nanotube. The activated carbon or carbon nanotube not only has favorable conductivity, but also has a large specific surface area, and can favorably form the primary pore size distribution in the inner active material layer and the outer active material layer.

In a second aspect, the present application provides a secondary battery, comprising a positive electrode sheet, a negative electrode sheet, a separator between the positive electrode sheet and the negative electrode sheet, and an electrolyte solution, where the positive electrode sheet is the positive electrode sheet in the first aspect of the present application.

In a third aspect, the present application provides a battery module, comprising the secondary battery in the second aspect of the present application.

In a fourth aspect, the present application provides a battery pack, comprising the secondary battery in the second aspect of the present application or the battery module in the third aspect of the present application.

In a fifth aspect, the present application provides an electrical apparatus, comprising the secondary battery in the second aspect of the present application, or the battery module in the third aspect of the present application, or the battery pack in the fourth aspect of the present application; where the secondary battery or the battery module or the battery pack is used as a power source or an energy storage unit of the electrical apparatus.

The secondary battery, the battery module, the battery pack, and the electrical apparatus provided in the present application comprise the positive electrode sheet in the first aspect of the present application, and thus have at least identical or similar technical effects to the above positive electrode sheet.

Figure 1:
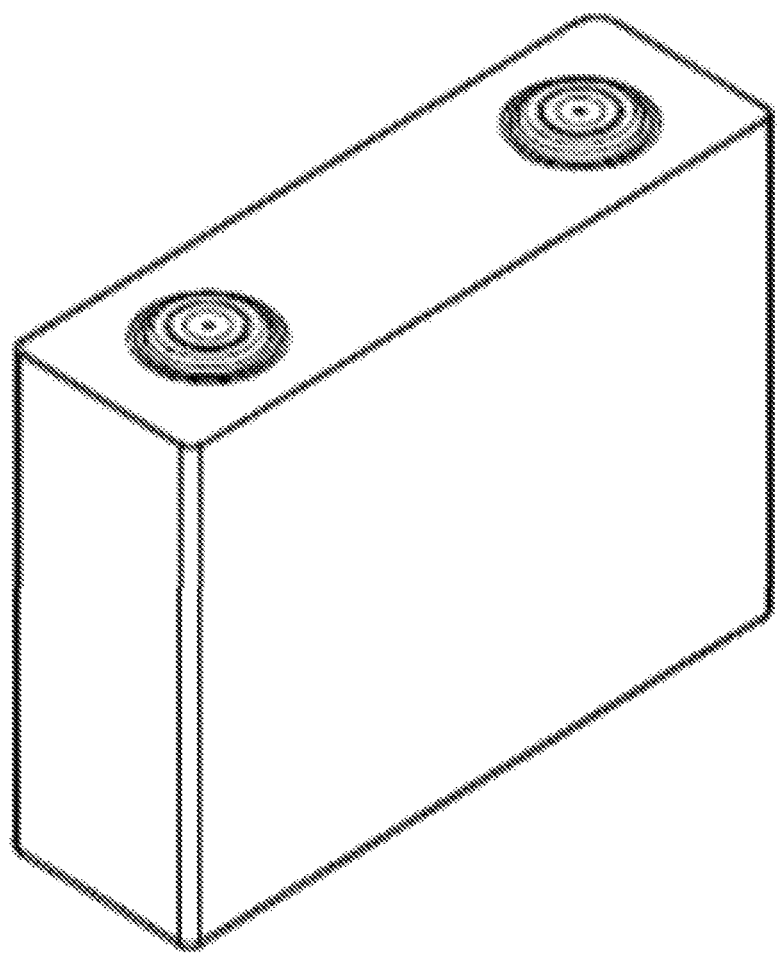
FIG. 1 is a space diagram of a secondary battery in a specific embodiment of the present application.

Description of reference numerals:
1. Battery pack;
2. Upper box;
3. Lower box;
4. Battery module;
5. Secondary battery;
51. Case;
52. Electrode assembly; and
53. Top cover assembly.

DETAILED DESCRIPTION

Embodiments of the technical solutions of the present application will be described in detail below with reference to the drawings. The following embodiments are merely used to more clearly describe the technical solutions of the present application, are therefore only used as examples, and cannot be used to limit the scope of protection of the present application. Unless otherwise defined, all technical terms and scientific terms used herein have the same meaning as commonly understood by those skilled in the technical field of the present application.

Reference herein to an "embodiment" means that a particular feature, structure, or characteristic described with reference to the embodiment may be included in at least one embodiment of the present application. The appearances of the phrase in various places in the specification neither necessarily refer to the same embodiment, nor are independent or alternative embodiments mutually exclusive with other embodiments. It is explicitly and implicitly understood by those skilled in the art that the embodiments described herein may be combined with other embodiments.

Positive Electrode Sheet

The first aspect of the present application provides a positive electrode sheet, comprising a positive electrode current collector and a positive electrode active material layer arranged on at least one surface of the positive electrode current collector. The positive electrode active material layer successively comprises an inner active material layer stacked on a surface of the positive electrode current collector and an outer active material layer stacked on a surface of the inner active material layer.

The inner active material layer has a three-level pore size distribution: an inner primary pore size distribution from 3 nm to 10 nm, and optionally from 6 nm to 10 nm; an inner secondary pore size distribution from 10 nm to 100 nm, and optionally from 10 nm to 84 nm; and an inner tertiary pore size distribution from 0.1 μm to 2 μm, and optionally from 0.1 μm to 1.26 μm.

The outer active material layer has a three-level pore size distribution: an outer primary pore size distribution from 0.5 nm to 3 nm, and optionally from 1 nm to 3 nm; an outer secondary pore size distribution from 10 nm to 100 nm, and optionally from 60 nm to 100 nm; and an outer tertiary pore size distribution from 0.1 μm to 2 μm, and optionally from 0.45 μm to 2 μm.

The pore size distribution in the present application refers to an equivalent diameter distribution of pore channels in a porous solid, and can be determined by gas adsorption method and/or mercury porosimetry, for example, with reference to GB T 21650.1-2008 Pore size distribution and porosity of solid materials by mercury porosimetry and gas adsorption.

The inventor holds that rapid increase of viscosity and sharp decline of internal lithium-ion transport capacity of a secondary battery at a low temperature are an important reason for its poor charge-discharge performance in a low-temperature environment. The inventor further presents that: on the one hand, when there is a micropore with a small pore size in the positive electrode active material layer, the micropore becomes a main factor affecting the lithium-ion transport capacity. When the pore size of the micropore is less than a size of 1 solvated lithium-ion (a diameter of the solvated lithium-ion is about 1 nm), the solvated lithium-ion fails to pass through the micropore, and the battery has extremely low lithium-ion transport capacity; when the pore size of the micropore is a size of 1-3 solvated lithium-ions, the battery has moderate lithium-ion transport capacity; and when the pore size of the micropore is a size of 4-10 solvated lithium-ions, the battery has optimum lithium-ion transport capacity. On the other hand, there is a wide particle size distribution of the active material on a surface of the positive electrode sheet, indicating that the active material has different particle sizes and a high irregularity degree. In this case, large particles occupy larger positions, thereby reducing pore gaps formed by accumulation of particles, and forming space occupying effects. However, small particles will fill in pore gaps formed by accumulation of other particles, thereby forming filling effects. Neither the space occupying effects nor the filling effects contribute to lithium-ion transport.

On this basis, the technical solutions provided in the present application include: forming a bilayer coated active material layer on the surface of the positive electrode current collector: forming a three-level pore size distribution in an inner layer: 3 nm-10 nm (optionally 6 nm-10 nm), 10 nm-100 nm (optionally 10 nm-84 nm), and 0.1 μm-2 μm (optionally 0.1 μm-1.26 μm); and forming a three-level pore size distribution in an outer layer: 0.5 nm-3 nm (optionally 1 nm-3 nm), 10 nm-100 nm (optionally 60 nm-100 nm), and 0.1 μm-2 μ(optionally 0.45 μm-2 μm). Under the premise that mass and energy density of the positive electrode active material are not reduced, such a bilayered three-level pore size distribution not only guarantees lithium-ion transport capacity of micropores in the active material layer, but also achieves consistent lithium-ion transport capacity in the inner active material layer and the outer active material layer. At the same time, the pore size distribution in the inner active material layer and the outer active material layer is reasonable, thereby avoiding space occupying effects and filling effects, improving conductivity of the electrode sheet in this case, avoiding or reducing sharp decline of internal lithium-ion transport capacity of the secondary battery at a low temperature, and significantly improving low-temperature charge-discharge performance of the secondary battery.

Further, in an embodiment of the present application, the inner active material layer may comprise an inner conductive agent and an inner active material, and the outer active material layer may comprise an outer conductive agent and an outer active material.

In an embodiment of the present application, the primary pore size distribution in the inner layer and the outer layer can be formed by selecting a conductive agent particle with a specific surface area in a specific range. In some embodiments, a specific surface area of the inner conductive agent may be from 300 $m^2/g$ to 1,000 $m^2/g$ (optionally from 800 $m^2/g$ to 1,000 $m^2/g$). In some embodiments, a specific surface area of the outer conductive agent may be from 1,000 $m^2/g$ to 2,500 $m^2/g$ (optionally from 2,000 $m^2/g$ to 2,500 $m^2/g$).

A specific surface area of the active material particle in the present application can be measured by gas adsorption method (BET) or mercury porosimetry. In the present application, the specific surface area has a well-known meaning in the art, and may be determined using known instruments and methods in the art, for example, may be tested using the specific surface area analysis and test method by nitrogen adsorption with reference to GB/T 19587-2017, and computed using the BET (BrunauerEmmett Teller) method, where the specific surface area analysis and test by nitrogen adsorption may be carried out using Tri-Star 3020 surface area and porosity analyzer of Micrometrics Instruments Corporation.

In an embodiment of the present application, a secondary pore size and a tertiary pore size in the inner layer and the outer layer can be formed by selecting an active material particle with bimodal particle size.

In some embodiments, a particle size distribution of the inner first active material may be from 24 nm to 600 nm, and optionally, the particle size distribution of the inner first active material may be from 24 nm to 200 nm. In some embodiments, a particle size distribution of the inner second active material may be from 0.25 μm to 13 μm, and optionally, the particle size distribution of the inner second active material may be from 0.5 μm to 3 μm.

In some embodiments, a particle size distribution of the outer first active material may be from 24 nm to 600 nm, and optionally, the particle size distribution of the outer first active material may be from 200 nm to 400 nm. In some embodiments, a particle size distribution of the outer second active material may be from 0.25 μm to 13 μ, and optionally, the particle size distribution of the outer second active material may be from 3 μm to 8 μm.

Further optionally, a particle size of the inner first active material may not overlap with the inner tertiary pore size; and a particle size of the outer first active material may not overlap with the outer tertiary pore size. That is, a particle size of an active material forming the secondary pore size in the inner layer and the outer layer is not equal to the tertiary pore size, thereby avoiding space occupying effects of first active material particles.

The particle size in the present application refers to an equivalent diameter of the active material particle, and means that when a to-be-tested active material particle is closest to a homogeneous sphere (or a combination of spheres) of a certain diameter, the diameter of the sphere (or the combination of spheres) is taken as a particle size distribution of the to-be-tested particle. In the present application, the particle size distribution of the active material particle can be detected using a laser particle size analyzer.

In some embodiments, a mass ratio of the inner first active material to the inner second active material may be (0.3-3):1. Optionally, the mass ratio of the inner first active material to the inner second active material may be (1-3):1.

In some embodiments, a mass ratio of the outer first active material to the outer second active material may be (0.3-3):1. Optionally, the mass ratio of the outer first active material to the outer second active material may be (0.3-1):1.

In the inner active material layer and the outer active material layer, when a mass ratio of the active material forming the secondary pore size (i.e., the first active material) to an active material forming the tertiary pore size (i.e., the second active material) is too large, the active material layer has a small compaction density, thereby resulting in decline of an energy density of the secondary battery. Otherwise, when the mass ratio of the active material forming the secondary pore size (i.e., the first active material) to the active material forming the tertiary pore size (i.e., the second active material) is too small, an internal lithium-ion transmission path in the active material with a large particle size is too long, thus having adverse effects on kinetic performance of the secondary battery.

In some embodiments, a mass ratio of the inner conductive agent to the inner active material may be (0.3-2):100. Optionally, the mass ratio of the inner conductive agent to the inner active material may be (1.5-2):100.

In some embodiments, a mass ratio of the outer conductive agent to the outer active material may be (0.3-3):100; and optionally, the mass ratio of the outer conductive agent to the outer active material may be (2.5-3):100.

In the inner active material layer and the outer active material layer, if the mass ratio of the conductive agent to the active material is too small, the conductivity becomes poor, which is not conducive to the kinetic performance. Otherwise, if the mass ratio of the conductive agent to the active material is too large, although increase of the conductive agent can increase the conductivity between the active materials, thereby improving an energy retention rate of the secondary battery to a certain extent, but failing to be conductive to improvement of the energy density of the secondary battery. In addition, a use amount of the conductive agent in each layer is also associated with a specific surface area of the active material and a particle size of the conductive agent in the layer. The larger the specific surface area of the active material is and the larger the particle size of the conductive agent is, the larger the use amount of the conductive agent is required. In the present application, the particle size of the inner active material is optionally larger than the particle size of the outer active material. Therefore, the use amount of the conductive agent in the inner layer is also optionally slightly smaller than the use amount of the conductive agent in the outer layer.

In some embodiments, the inner conductive agent and the outer conductive agent may each independently be selected from activated carbon or carbon nanotube. The activated carbon or carbon nanotube not only has favorable conductivity, but also has a large specific surface area, and can favorably form the primary pore size distribution in the inner active material layer and the outer active material layer.

In addition, in some embodiments of the present application, the specific type of the positive electrode active material is not particularly limited, as long as the positive electrode active material can satisfy intercalation and deintercalation of lithium-ions. The positive electrode active material either may be a material with a layered structure, such that the lithium-ions diffuse in a two-dimensional space, or may be a material with a spinel structure, such that the lithium-ions diffuse in a three-dimensional space. Optionally, the positive electrode active material may be one or more selected from of a lithium transition metal oxide or a compound obtained from doping a lithium transition metal oxide with other transition metals or non-transition metals or non-metals. Specifically, the positive electrode active material may be one or more selected from of a lithium-cobalt oxide, a lithium-nickel oxide, a lithium-manganese oxide, a lithium-nickel-manganese oxide, a lithium-nickel-cobalt-manganese oxide, a lithium-nickel-cobalt-aluminum oxide, or a lithium-containing phosphate of olivine structure.

A general formula of the lithium-containing phosphate of olivine structure may be $LiFe_{1-x-y}Mn_xM'_yPO_4$, where $0 \le x \le 1$, $0 \le y < 1$, $0 \le x+y \le 1$, M' may be one or more selected from of other transition metal elements or non-transition metal elements except for Fe and Mn, and M' may be one or more selected from of Cr, Mg, Ti, Al, Zn, W, Nb, or Zr. More optionally, the lithium-containing phosphate of olivine structure may be one or more selected from of lithium iron phosphate, lithium manganese phosphate, or lithium manganese iron phosphate.

The lithium transition metal oxide may be one or more selected from of $LiCoO_2$, $LiMnO_2$, $LiNiO_2$, $LiMn_2O_4$, $LiNi_xCo_yMn_{1-x-y}O_2$, $LiNi_xCo_yAl_{1-x-y}O_2$, or $LiNi_xMn_{2-x}O_4$, where $0<x<1$, $0<y<1$, and $0<x+y<1$. Optionally, the lithium transition metal oxide may be one or more selected from of $LiCoO_2$, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, $LiNi_{0.8}Co_{0.15}Mn_{0.05}O_2$, $LiNi_{0.8}Co_{0.15}Al_{0.05}O_2$, $LiNi_{0.5}Mn_{1.5}O_4$, or $LiMn_2O_4$.

In some embodiments of the present application, the positive electrode active material layer may further comprise a binder, where the type and content of the binder are not specifically limited, either, and may be selected according to actual requirements, The binder generally may include a fluorine-containing polyolefin binder. Compared with the fluorine-containing polyolefin binder, water is generally a good solvent, i.e., the fluorine-containing polyolefin binder generally has good solubility in water. For example, the fluorine-containing polyolefin binder may include, is but not limited to, polyvinylidene fluoride (PVDF), vinylidene fluoride copolymer, or a modified derivative (such as carboxylic acid, acrylic acid, and acrylonitrile) thereof. In the positive electrode material layer, a percentage mass content of the binder may be such that a use amount of the binder cannot be too high due to the poor conductivity of the binder itself.

In some embodiments of the present application, the type of the positive electrode current collector is not specifically limited, either, and may be selected according to actual requirements. The positive electrode current controller generally may be a layered body, and the positive electrode current controller is generally a structure or part capable of collecting current. The positive electrode current collector may be various materials suitable for use as positive electrode current collectors of electrochemical energy storage apparatuses in the art. For example, the positive electrode current collector may include, but is not limited to, a metal foil, and more specifically, may include, but is not limited to, a nickel foil and an aluminum foil.

Secondary Battery

In the second aspect, the present application provides a secondary battery, comprising a positive electrode sheet, a negative electrode sheet, a separator between the positive electrode sheet and the negative electrode sheet, and an electrolyte solution, where the positive electrode sheet is the positive electrode sheet in the first aspect of the present application.

In some embodiments, the negative electrode sheet of the secondary battery generally comprises a negative electrode current collector and a negative electrode active material layer arranged on a surface of the negative electrode current collector, and the negative electrode active material layer generally comprises a negative electrode active material. The negative electrode active material may be various materials suitable for negative electrode active materials of lithium secondary batteries in the art, for example, may include, but is not limited to, a combination of one or more of graphite, soft carbon, hard carbon, carbon fiber, mesocarbon microbead, silicon-based material, tin-based material, lithium titanate, or other metals that can be alloyed with lithium. The graphite may be selected from a combination of one or more of artificial graphite, natural graphite, and modified graphite; the silicon-based material may be selected from a combination of one or more of elementary silicon, silicon-oxygen compound, silicon-carbon composite, and silicon alloy; and the tin-based material may be selected from a combination of one or more of elementary tin, tin-oxygen compound, and tin alloy. The negative electrode current collector is generally a structure or part collecting current. The negative electrode current collector may be various materials suitable for use as negative electrode current collectors of lithium secondary batteries in the art. For example, the negative electrode current collector may include, but is not limited to, a metal foil, and more specifically, may include, but is not limited to, a copper foil. In addition, the negative electrode sheet may also be a lithium sheet.

In some embodiments, the electrolyte solution of the secondary battery may be various electrolyte solutions suitable for secondary batteries in the art. For example, the electrolyte solution generally comprises an electrolyte and a solvent; the electrolyte generally may include a lithium salt; and more specifically, the lithium salt may be an inorganic lithium salt and/or an organic lithium salt, and specifically may include, but is not limited to, a combination of one or more of $LiPF_6$, $LiBF_4$, $LiN(SO_2F)_2$ (abbreviated as LiFSI), $LiN(CF_3SO_2)_2$ (abbreviated as LiTFSI), $LiClO_4$, $LiAsF_6$, $LiB(C_2O_4)_2$ (abbreviated as LiBOB), and $LiBF_2C_2O_4$ (abbreviated as LiDFOB). For another example, a concentration of the electrolyte may be from 0.8 mol/L to 1.5 mol/L. The solvent may be various solvents suitable for electrolyte solutions of secondary batteries in the art. The solvent of the electrolyte solution is generally a non-aqueous solvent, may be an organic solvent, and specifically may include, but is not limited to, a combination of one or more of ethylene carbonate, propylene carbonate, butylene carbonate, pentylene carbonate, dimethyl carbonate, diethyl carbonate, dipropyl carbonate, ethyl methyl carbonate, or a halogenated derivative thereof.

In some embodiments, the separator of the secondary battery may be various materials suitable for separators of secondary batteries in the art, for example, may include, but is not limited to, a combination of one or more of polyethylene, polypropylene, polyvinylidene fluoride, aramid, polyethylene terephthalate, polytetrafluoroethylene, polyacrylonitrile, polyimide, polyamide, polyester, and natural fiber.

In some embodiments, the method for preparing a secondary battery should be known to those skilled in the art. For example, the positive electrode sheet, the separator, and the negative electrode sheet may each be a layered body, such that they may be cut to a target size and then sequentially stacked, or may be winded to the target size to form a battery cell, and may be further combined with the electrolyte solution to form the secondary battery.

Figure 2:
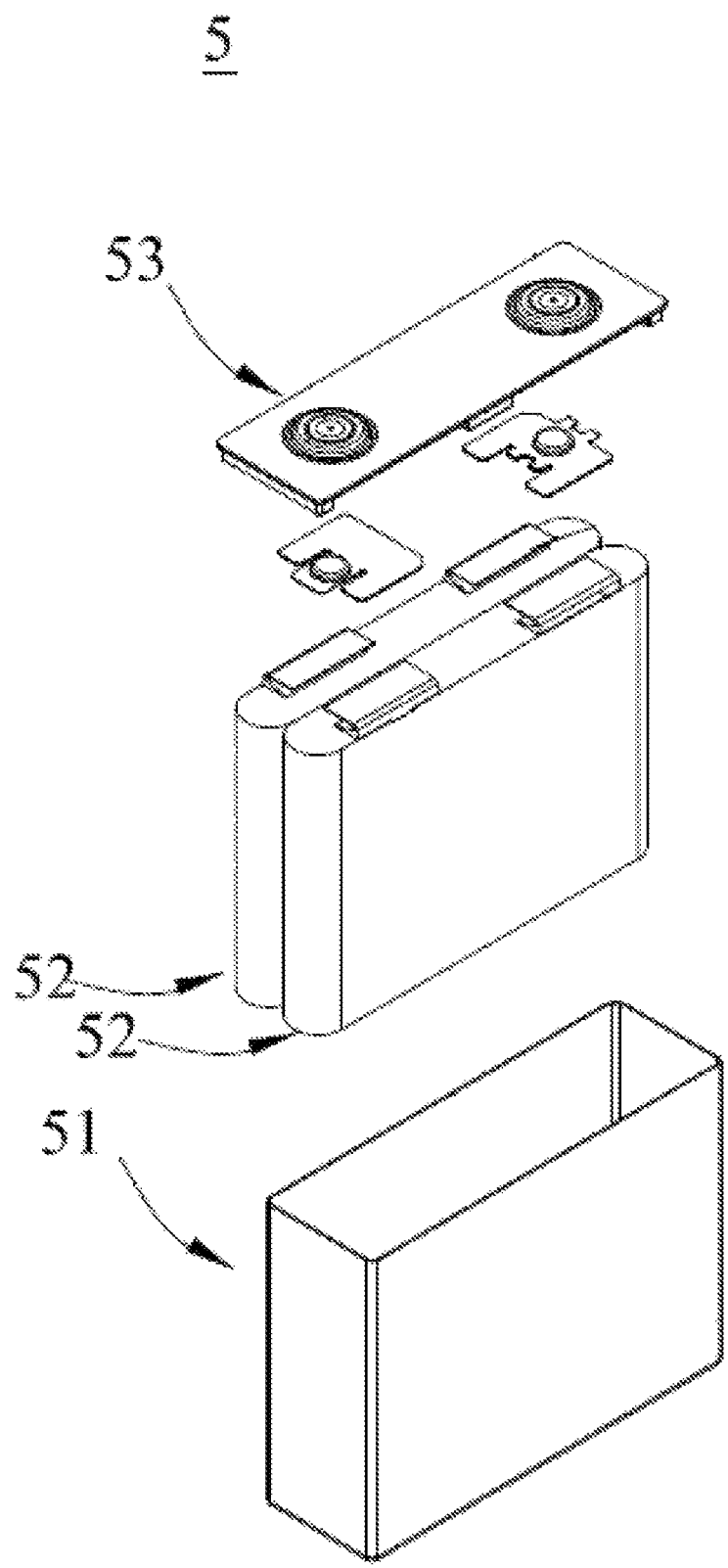
FIG. 2 is an exploded view of the secondary battery shown in FIG. 1.

FIG. 1 shows a space diagram of a secondary battery in a specific embodiment of the present application, and FIG. 2 is an exploded view of the secondary battery shown in FIG. 1. Referring to FIG. 1 and FIG. 2, the secondary battery 5 (hereinafter referred to as battery cell 5) according to the present application comprises an outer package 51, an electrode assembly 52, a top cover assembly 53, and an electrolyte solution (not shown). The electrode assembly 52 is accommodated within the case 51. The number of electrode assemblies 52 is not defined, and may be one or more.

It should be noted that the battery cell 5 shown in FIG. 1 is a tank-type battery, but is not limited to the tank-type battery in the present application. The battery cell 5 may be a bag-type battery, i.e., the case 51 is replaced with a metal plastic film, and the top cover assembly 53 is canceled.

Battery Module

Figure 3:
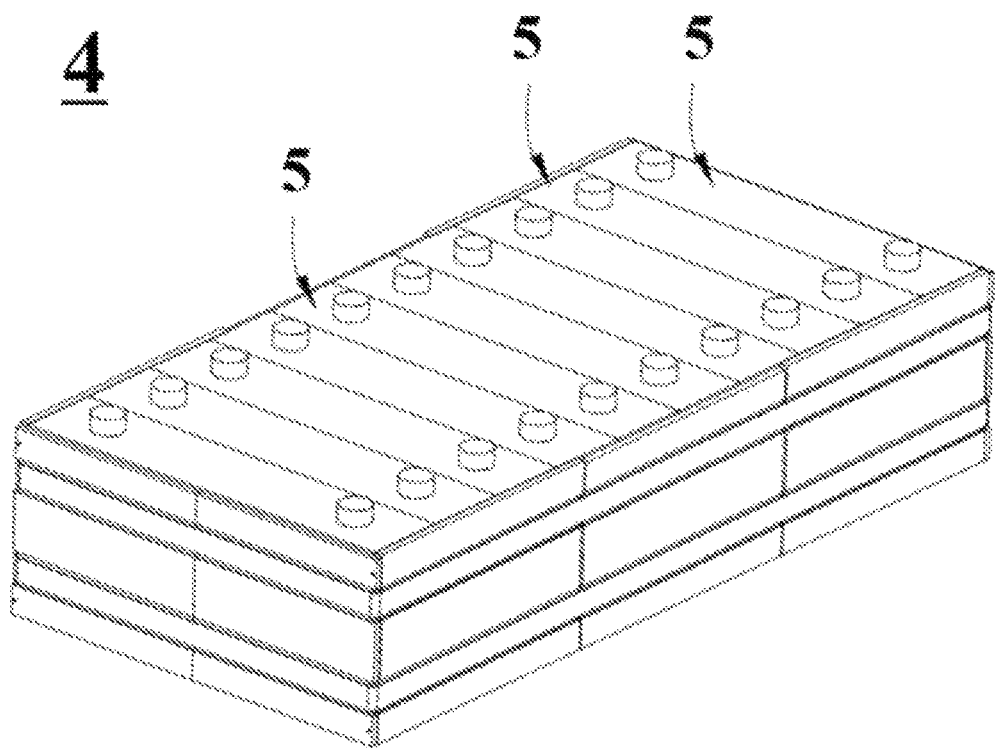
FIG. 3 is a space diagram of a battery module in a specific embodiment of the present application.

The third aspect of the present application provides a battery module, comprising the secondary battery in the second aspect of the present application. In some embodiments, the secondary batteries may be assembled into a battery module, the number of secondary batteries comprised in the battery module may be a plural number, and the specific number may be adjusted based on the application and capacity of the battery module. FIG. 3 is a space diagram of a battery module 4 as an example. Referring to FIG. 3, in the battery module 4, a plurality of secondary batteries 5 may be sequentially arranged along a length direction of the battery module 4, and of course, may also be arranged in any other manner. The plurality of secondary batteries 5 may further be fixed by fasteners. Optionally, the battery module 4 may further include a case having an accommodating space, in which the plurality of secondary batteries 5 is accommodated.

Battery Pack

Figure 4:
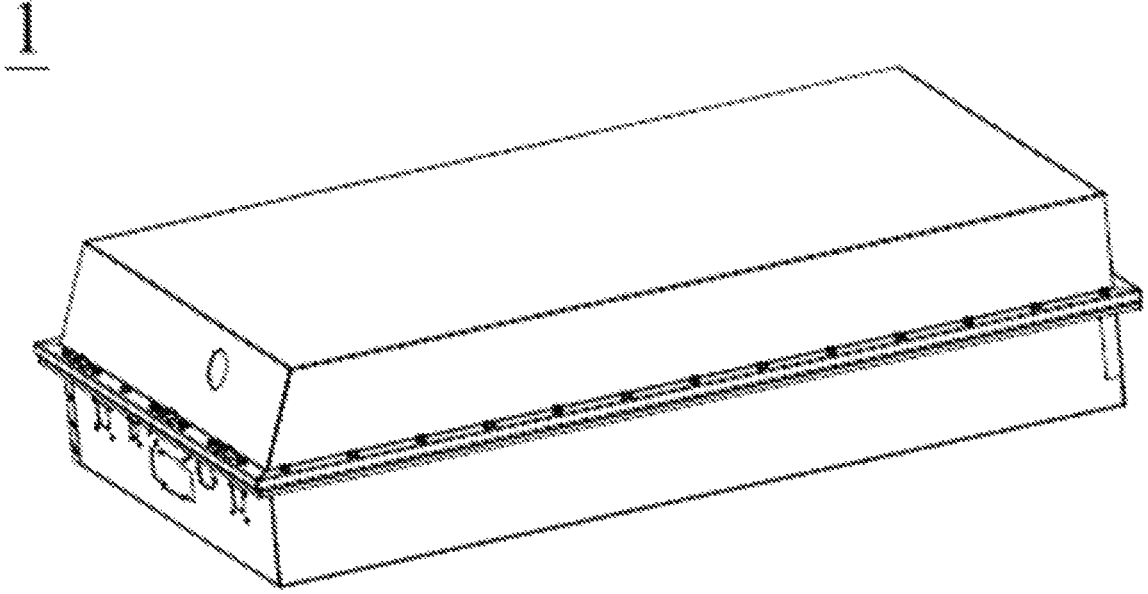
FIG. 4 is a space diagram of a battery pack in a specific embodiment of the present application.
Figure 5:
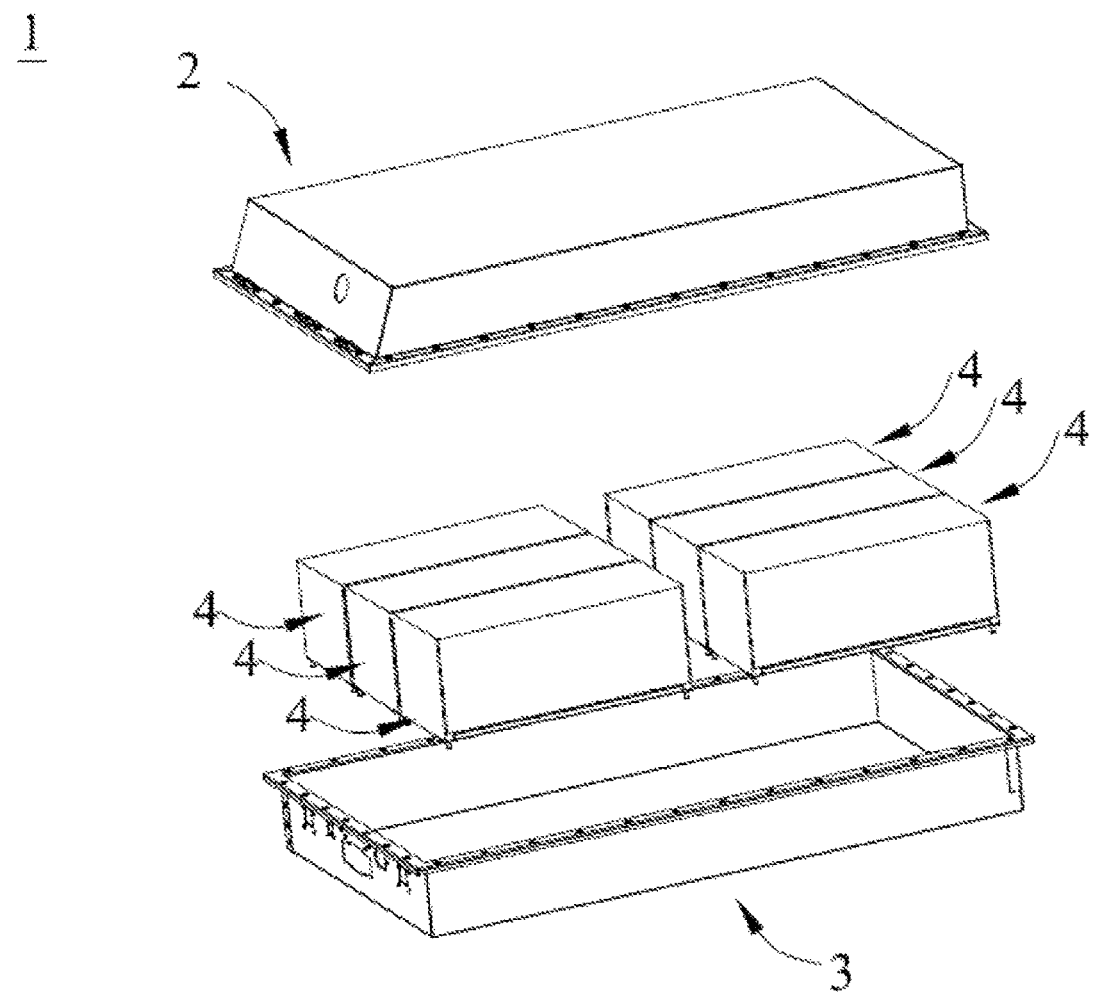
FIG. 5 is an exploded view of the battery pack shown in FIG. 4.

The fourth aspect of the present application provides a battery pack, comprising the battery module in the third aspect of the present application. In some embodiments, the battery modules may be assembled into a battery pack, and the number of battery modules comprised in the battery pack may be adjusted based on the application and capacity of the battery pack. FIG. 4 is a space diagram of a battery pack 1 as an example, and FIG. 5 is an exploded view of the battery pack shown in FIG. 4. Referring to FIG. 4 and FIG. 5, the battery pack 1 may comprise a battery box and a plurality of battery modules 4 arranged in the battery box. The battery box comprises an upper box 2 and a lower box 3. The upper box 2 can cover the lower box 3 and form an enclosed space for accommodating the battery module 4. The plurality of battery modules 4 may be arranged in the battery box in any manner.

Electrical Apparatus

The fifth aspect of the present application provides an electrical apparatus, comprising the secondary battery in the second aspect of the present application, or the battery module in the third aspect of the present application, or the battery pack in the fourth aspect of the present application. The secondary battery, or the battery module, or the battery pack may be used as a power source of the electrical apparatus, or an energy storage unit of the electrical apparatus. The electrical apparatus may be, but is not limited to, a mobile device (such as a mobile phone or a laptop), an electric vehicle (such as an all-electric vehicle, a hybrid electric vehicle, a plug-in hybrid electric vehicle, an electric bicycle, an electric scooter, an electric golf cart, an electric truck), an electric train, a ship, a satellite, an energy storage system, etc.

The secondary battery, the battery module, or the battery pack may be selected for the electrical apparatus based on use demand thereof.

Figure 6:
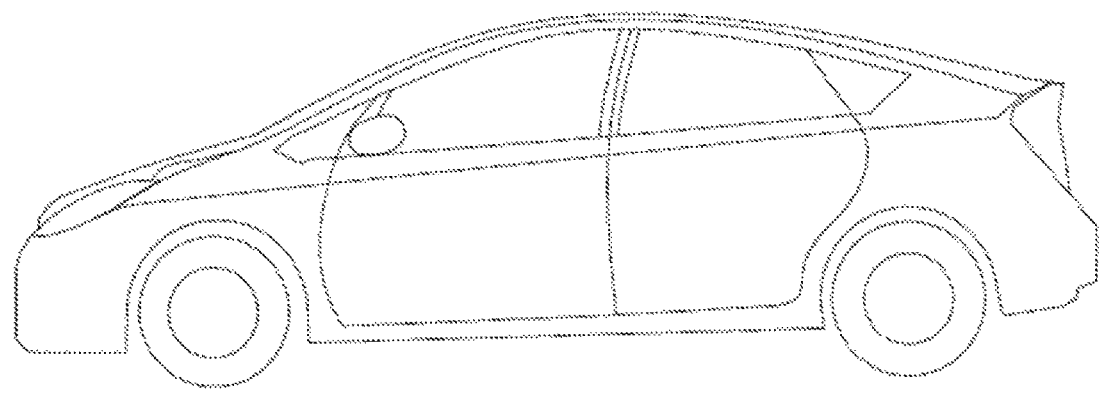
FIG. 6 is a schematic diagram of an electrical apparatus in a specific embodiment of the present application.

FIG. 6 shows a schematic diagram of an electrical apparatus in a specific embodiment of the present application. The electrical apparatus may be, e.g., an all-electric vehicle, a hybrid electric vehicle, or a plug-in hybrid electric vehicle. In order to meet the requirements of the electrical apparatus for high power and high energy density of secondary batteries, a battery pack or a battery module may be used.

As another example, the electrical apparatus may be a mobile phone, a tablet, a laptop, etc. The electrical apparatus is generally required to be light and thin, and can use a secondary battery of the present application as a power source.

Those skilled in the art can understand that: in different examples of the present application, various definitions or optional ranges of component selection, component content, and physical and chemical performance parameters of the electrochemical active material can be combined in any manner, and various examples obtained from combinations thereof are still encompassed within the scope of the present application, and are considered as a part of contents disclosed in the present specification.

Advantages of the present application will be further described below with reference to specific examples. It should be understood that these examples are provided merely to illustrate the present application, rather than limiting the scope of the present application.

Preparation of a Positive Electrode Sheet and a Secondary Battery

Preparation of the positive electrode sheet and the secondary battery in Examples 1-15 and Comparative Examples 1-5:

1. Preparation of the positive electrode sheet:

(1) Coating of an inner layer: an inner first active material and an inner second active material were proportionally mixed. The resulting mixture, a binder (1.8%), a dispersant (0.2%), and an appropriate amount of NMP were fully stirred and mixed, to form a homogeneous slurry for the inner layer. The slurry for the inner layer was coated on the positive electrode current collector (an Al foil), and dried; and (2) Coating of an outer layer: an outer first active material and an outer second active material were proportionally mixed. The resulting mixture, a binder (1.6%), a dispersant (0.2%), and an appropriate amount of NMP were fully stirred and mixed, to form a homogeneous slurry for the outer layer. The slurry was coated on the electrode sheet coated with the slurry for the inner layer, and dried. Then, the positive electrode sheet was cold pressed to a designed compaction density, and striped for later use.

2. A negative electrode sheet, a separator, an electrolyte solution, and a case were obtained according to conventional methods in the art:

Negative electrode sheet: A negative electrode active material (graphite), conductive carbon, and a binder (polyvinylidene fluoride (PVDF)) at a weight ratio of 95:3:2 were fully stirred mixed in an appropriate amount of an aqueous solvent, to form a homogeneous negative electrode slurry; The slurry was coated on a negative current collector (a Cu foil), and dried. Then, the electrode sheet was cold pressed to a designed compaction density, and striped for later use.

Separator: A PP separator of 12 μm was used.

Electrolyte solution: A universal electrolyte solution (lithium iron phosphate) was used.

Case: An aluminum plastic film was used as a case material.

3. Preparation of the secondary battery:

The positive electrode sheet, the separator, and the negative electrode sheet were winded to form a bare battery cell. The bare battery cell was encapsulated with the aluminum plastic film, into which the electrolyte solution was injected. The lithium secondary battery was obtained through formation, venting, and high-temperature aging.

Performance Test of the Secondary Battery

The following performance test was performed on the secondary battery in Examples 1-5 and Comparative Examples 1-15:

1. Test of a cycling energy retention rate of the secondary battery

The test process is shown in Table 1 (where C is rated capacity of the battery cell).

TABLE 1

| Step No. | Test process | Temperature (° C.) | Notes |
|---|---|---|---|
| step 1, normal temperature capacity process | | | |
| 1) | Rest 5 min | 25 | |
| 2) | 1/3 C DC 2.8 V | 25 | |
| 3) | Rest 15 min | 25 | |
| 4) | 1/3 C CC 4.2 V CV 0.05 C | 25 | |
| 5) | Rest 15 min | 25 | |
| 6) | 1/3 C DC 2.8 V | 25 | (Energy E0) |
| 7) | Rest 15 min | 25 | |
| Step 2, −10° C. capacity process | | | |
| 1) | Rest 2 h | 25 | |
| 2) | 1/3 C CC 4.2 V CV 0.05 C | 25 | |
| 3) | Rest 2 h | −10 | |
| 4) | 1/3 C DC 2.8 V | −10 | (Energy E1) |

According to the above test steps, the −10° C. energy retention rate was obtained: −10° C. energy retention rate=E1/E0.

2. Power performance test at a low temperature in a low SOC:

The test process is shown in Table 2 (where C is rated capacity of the battery cell). The battery cell with the rated capacity of 20 Ah was tested.

TABLE 2

| Step No. | Test process | Temperature (° C.) | Notes |
|---|---|---|---|
| step 1, capacity process | | | |
| 1) | Rest 5 min | 25 | |
| 2) | 1/3 C DC 2.8 V | 25 | |
| 3) | Rest 15 min | 25 | |

TABLE 2-continued

| Step No. | Test process | Temperature (° C.) | Notes |
|---|---|---|---|
| 4) | 1/3 C CC 4.2 V CV 0.05 C | 25 | |
| 5) | Rest 15 min | 25 | |
| 6) | 1/3 C DC 2.8 V | 25 | (denoting actual capacity C0 in this step) |
| 7) | Rest 15 min | 25 | |
| step 2, −10° C. 30% SOC 30 s power test process | | | |
| 1) | Rest 5 min | 25 | |
| 2) | 1/3 C CC 4.2 V CV 0.05 C | 25 | |
| 3) | Rest 10 min | 25 | |
| 4) | 1/3 C DC 0.7C0Ah | 25 | (adjusted to 30% SOC) |
| 5) | PAUSE −20° C. | −10 | |
| 6) | Rest 2 h | −10 | |
| 7) | Px DP 30 s | −10 | Denoting capacity Cx |
| 8) | Rest 10 min | −10 | |
| 9) | 0.05 C CC 1CxAh | −10 | |
| 10) | Rest 10 min | −10 | |
| 11) | repeating steps 7-10, until the voltage in step 7 was 2.1 ± 0.05 V | −10 | until the cycle voltage was 2.1 ± 0.05 V, where Px was taken as its maximum output power (Pmax) |

Preparation parameters and performance test data of the positive electrode sheet and the secondary battery in Examples 1-15 and Comparative Examples 1-5 are shown in Table 3.

TABLE 3

| | | Composition of active material layer of positive electrode sheet | | | | | | | | Battery performance test | |
|---|---|---|---|---|---|---|---|---|---|---|---|
| | | Specific surface area of conductive agent (m²/g) | Particle size of first active material (nm) | Particle size of second active material (μm) | Mass ratio of first active material to second active material | Mass ratio of conductive agent to active material | Primary pore size distribution | Secondary pore size distribution | Tertiary pore size distribution | −10° C. energy retention rate (%) | Maximum output power (w) |
| Example 1 | Inner active material layer | 300 | 24~600 | 0.25~13 | 1:1 | 1.8:100 | 3 nm~10 nm | 10 nm~100 nm | 0.1 μm~2 μm | 84% | 160 |
| | Outer active material layer | 1000 | 24~600 | 0.25~13 | 1:1 | 1.8:100 | 0.5 nm~3 nm | 10 nm~100 nm | 0.1 μm~2 μm | | |
| Example 2 | Inner active material layer | 800 | 24~600 | 0.25~13 | 1:1 | 1.8:100 | 6 nm~10 nm | 10 nm~100 nm | 0.1 μm~2 μm | 88% | 170 |
| | Outer active material layer | 1000 | 24~600 | 0.25~13 | 1:1 | 1.8:100 | 0.5 nm~3 nm | 10 nm~100 nm | 0.1 μm~2 μm | | |
| Example 3 | Inner active material layer | 300 | 24~200 | 0.5~3 | 1:1 | 1.8:100 | 3 nm~10 nm | 10 nm~84 nm | 0.1 μm~1.26 μm | 88% | 169 |
| | Outer active material layer | 1500 | 24~600 | 0.25~13 | 1:1 | 1.8:100 | 0.5 nm~3 nm | 10 nm~100 nm | 0.1 μm~2 μm | | |
| Example 4 | Inner active material layer | 800 | 24~200 | 0.5~3 | 1:1 | 1.8:100 | 6 nm~10 nm | 10 nm~84 nm | 0.1 μm~1.26 μm | 89% | 176 |
| | Outer active material layer | 1000 | 24~600 | 0.25~13 | 1:1 | 1.8:100 | 0.5 nm~3 nm | 10 nm~100 nm | 0.1 μm~2 μm | | |
| Example 5 | Inner active material layer | 300 | 24~600 | 0.25~13 | 1:1 | 1.8:100 | 3 nm~10 nm | 10 nm~100 nm | 0.1 μm~2 μm | 84% | 160 |
| | Outer active material layer | 2000 | 24~600 | 0.25~13 | 1:1 | 1.8:100 | 1 nm~3 nm | 10 nm~100 nm | 0.1 μm~2 μm | | |
| Example 6 | Inner active material layer | 300 | 24~600 | 0.25~13 | 1:1 | 1.8:100 | 3 nm~10 nm | 10 nm~100 nm | 0.1 μm~2 μm | 86% | 165 |
| | Outer active material layer | 1000 | 200~400 | 3~8 | 1:1 | 1.8:100 | 0.5 nm~3 nm | 60 nm~100 nm | 0.45 μm~2 μm | | |
| Example 7 | Inner active material layer | 300 | 24~600 | 0.25~13 | 1:1 | 1.8:100 | 3 nm~10 nm | 10 nm~100 nm | 0.1 μm~2 μm | 86% | 166 |
| | Outer active material layer | 2000 | 200~400 | 3~8 | 1:1 | 1.8:100 | 1 nm~3 nm | 60 nm~100 nm | 0.45 μm~2 μm | | |
| Example 8 | Inner active material layer | 800 | 24~600 | 0.25~13 | 1:1 | 1.8:100 | 6 nm~10 nm | 10 nm~100 nm | 0.1 μm~2 μm | 90% | 180 |
| | Outer active material layer | 2000 | 24~600 | 0.25~13 | 1:1 | 1.8:100 | 1 nm~3 nm | 10 nm~100 nm | 0.1 μm~2 μm | | |
| Example 9 | Inner active material layer | 300 | 24~200 | 0.5~3 | 1:1 | 1.8:100 | 3 nm~10 nm | 10 nm~84 nm | 0.1 μm~1.26 μm | 88% | 171 |
| | Outer active material layer | 1000 | 200~400 | 3~8 | 1:1 | 1.8:100 | 0.5 nm~3 nm | 60 nm~100 nm | 0.45 μm~2 μm | | |
| Example 10 | Inner active material layer | 800 | 24~200 | 0.5~3 | 1:1 | 1.8:100 | 6 nm~10 nm | 10 nm~84 nm | 0.1 μm~1.26 μm | 92% | 183 |
| | Outer active material layer | 2000 | 200~400 | 3~8 | 1:1 | 1.8:100 | 1 nm~3 nm | 60 nm~100 nm | 0.45 μm~2 μm | | |
| Example 11 | Inner active material layer | 800 | 24~200 | 0.5~3 | 0.3:1 | 1.8:100 | 6 nm~10 nm | 10 nm~84 nm | 0.1 μm~1.26 μm | 87% | 167 |
| | Outer active material layer | 2000 | 200~400 | 3~8 | 0.3:1 | 1.8:100 | 1 nm~3 nm | 60 nm~100 nm | 0.45 μm~2 μm | | |

TABLE 3-continued

Composition of active material layer of positive electrode sheet

| | | Specific surface area of conductive agent (m²/g) | Particle size of first active material (nm) | Particle size of second active material (μm) | Mass ratio of first active material to second active material | Mass ratio of conductive agent to active material | Primary pore size distribution | Secondary pore size distribution | Tertiary pore size distribution | Battery performance test | |
|---|---|---|---|---|---|---|---|---|---|---|---|
| | | | | | | | | | | −10° C. energy retention rate (%) | Maximum output power (w) |
| Example 12 | Inner active material layer | 800 | 24~200 | 0.5~3 | 3:1 | 1.8:100 | 6 nm~10 nm | 10 nm~84 nm | 0.1 μm~1.26 μm | 93% | 192 |
| | Outer active material layer | 2000 | 200~400 | 3~8 | 3:1 | 1.8:100 | 1 nm~3 nm | 60 nm~100 nm | 0.45 μm~2 μm | | |
| Example 13 | Inner active material layer | 800 | 24~200 | 0.5~3 | 1:1 | 0.3:100 | 6 nm~10 nm | 10 nm~84 nm | 0.1 μm~1.26 μm | 86% | 165 |
| | Outer active material layer | 2000 | 200~400 | 3~8 | 1:1 | 0.3:100 | 1 nm~3 nm | 60 nm~100 nm | 0.45 μm~2 μm | | |
| Example 14 | Inner active material layer | 800 | 24~200 | 0.5~3 | 1:1 | 1.5:100 | 6 nm~10 nm | 10 nm~84 nm | 0.1 μm~1.26 μm | 93% | 193 |
| | Outer active material layer | 2000 | 200~400 | 3~8 | 1:1 | 2.5:100 | 1 nm~3 nm | 60 nm~100 nm | 0.45 μm~2 μm | | |
| Example 15 | Inner active material layer | 800 | 24~200 | 0.5~3 | 1:1 | 2:100 | 6 nm~10 nm | 10 nm~84 nm | 0.1 μm~1.26 μm | 95% | 198 |
| | Outer active material layer | 2000 | 200~400 | 3~8 | 1:1 | 3:100 | 1 nm~3 nm | 60 nm~100 nm | 0.45 μm~2 μm | | |
| Comparative Example 1 | Single active material layer | 300 | 50~2000 | | / | 1.8:100 | | 0.3~10 um | | 67% | 123 |
| Comparative Example 2 | Inner active material layer | 200 | 24~600 | 0.25~13 | 1:1 | 1.8:100 | 10~50 nm | 10 nm~100 nm | 0.1 μm~2 μm | 72% | 135 |
| | Outer active material layer | 200 | 24~600 | 0.25~13 | 1:1 | 1.8:100 | 10~50 nm | 10 nm~100 nm | 0.1 μm~2 μm | | |
| Comparative Example 3 | Inner active material layer | 800 | 600~1000 | 13~20 | 1:1 | 1.8:100 | 6 nm~10 nm | 100 nm~400 nm | 2 μm~4 μm | 76% | 143 |
| | Outer active material layer | 2000 | 600~1000 | 13~20 | 1:1 | 1.8:100 | 1 nm~3 nm | 100 nm~400 nm | 2 μm~4 μm | | |
| Comparative Example 4 | Inner active material layer | 200 | 600~1000 | 13~20 | 1:1 | 1.8:100 | 10~50 nm | 100 nm~400 nm | 2 μm~4 μm | 70% | 130 |
| | Outer active material layer | 200 | 600~1000 | 13~20 | 1:1 | 1.8:100 | 10~50 nm | 100 nm~400 nm | 2 μm~4 μm | | |
| Comparative Example 5 | Inner active material layer | 2000 | 200~400 | 3~8 | 1:1 | 3:100 | 1 nm~3 nm | 60 nm~100 nm | 0.45 μm~2 μm | 60% | 103 |
| | Outer active material layer | 800 | 24~200 | 0.5~3 | 1:1 | 2:100 | 6 nm~10 nm | 10 nm~84 nm | 0.1 μm~1.26 μm | | |

As can be seen from the battery performance test data in Table 3, the active material layer of the positive electrode sheet in Examples 1-15 has the characteristics of the bilayered three-level pore size distribution provided in the present disclosure. Under the premise that mass and energy density of the positive electrode active material are not reduced, such a bilayered three-level pore size distribution not only guarantees lithium-ion transport capacity of micropores in the active material layer, but also achieves consistent lithium-ion transport capacity in the inner active material layer and the outer active material layer. At the same time, the pore size distribution in the inner active material layer and the outer active material layer is reasonable, thereby avoiding space occupying effects and filling effects, further avoiding or reducing sharp decline of internal lithium-ion transport capacity of the secondary battery in a low-temperature environment, and significantly improving low-temperature charge-discharge performance of the secondary battery. Therefore, the low-temperature energy retention rate of the secondary battery and the maximum output power of the secondary battery at a low temperature in a low SOC in Examples 1-15 in Table 3 are obviously better than those in Comparative Examples 1-5.

In Comparative Example 1, the active material layer on the surface of the positive electrode sheet is monolayer coated, and the monolayer coated active material layer has no characteristics of the three-level pore size distribution. In Comparative Example 1, both internal kinetic performance and external kinetic performance of the electrode sheet are poor, and the low-temperature charge-discharge performance of the secondary battery is obviously worse than that in Examples 1-15.

In Comparative Example 2, the primary pore size of the inner active material layer and the outer active material layer is too large, which is conductive to transport of the electrolyte solution, but the specific surface area of the active material layer is significantly reduced, and its electrochemical active point location is also significantly reduced. In Comparative Example 3, the secondary pore size and the tertiary pore size of the inner active material layer and the outer active material layer are too large, i.e., the particle size of the active material particle is also large, and the kinetic performance of the large active material particle is poor, which is more obvious at a low temperature. In Comparative Example 4, the primary pore size of the inner active material layer and the outer active material layer is too large, and the secondary pore size and the tertiary pore size of the inner active material layer and the outer active material layer are too large, so that the battery has the defects of both Comparative Example 2 and Comparative Example 3. In Comparative Examples 2-4, the active material layer on the surface of the positive electrode sheet is also bilayer coated and has a three-level pore size distribution, but the pore size distribution is not reasonable, thereby failing to effectively contribute to lithium-ion transport, and failing to avoid sharp decline of internal lithium-ion transport capacity of the secondary battery in a low-temperature environment. Therefore, in Comparative Examples 2-4, the low-temperature charge-discharge performance of the secondary battery is not improved, as shown by poor low-temperature energy retention rate and poor maximum output power at a low temperature in a low SOC.

In Comparative Example 5, the active material layer on the surface of the positive electrode sheet is also bilayer coated and has a three-level pore size distribution, but a particle size distribution solution of the active material particle with better kinetic performance is used as the outer active material layer, while a particle size distribution solution of the active material particle with poor kinetic performance is used as the inner active material layer, thereby failing to effectively contribute to lithium-ion transport. In Comparative Example 5, the low-temperature energy retention rate of the secondary battery and the maximum output power of the secondary battery at a low temperature in a low SOC are even worse than those in Comparative Examples 1-4.

Examples 11 and 12 show the effects of the mass ratio of the first active material to the second active material in the inner active material layer and the outer active material layer on the technical effects of the present disclosure. When a mass ratio of an active material forming the secondary pore size (i.e., the first active material) to an active material forming the tertiary pore size (i.e., the second active material) is too large, the active material layer has a small compaction density, thereby resulting in decline of an energy density of the secondary battery. Otherwise, when the mass ratio of the active material forming the secondary pore size (i.e., the first active material) to the active material forming the tertiary pore size (i.e., the second active material) is small, an internal lithium-ion transmission path in the active material with a large particle size is too long, thus having adverse effects on kinetic performance of the secondary battery.

Examples 13-15 show the effects of the mass ratio of the conductive agent to the active material in the inner active material layer and the outer active material layer on the technical effects of the present disclosure. If the mass ratio of the conductive agent to the active material is too small, the conductivity becomes poor, which is not conducive to the kinetic performance. Otherwise, if the mass ratio of the conductive agent to the active material is too large, although increase of the conductive agent can increase the conductivity between the active materials, thereby improving an energy retention rate of the secondary battery to a certain extent, but failing to be conductive to improvement of the energy density of the secondary battery.

According to the disclosure and teachings in the above specification, those skilled in the art can further make alterations and modifications to the above embodiments. Therefore, the present application is not limited to the specific embodiments disclosed and described above, and some modifications and alterations to the present application should also be encompassed within the scope of protection of the claims of the present application. In addition, although some specific terms are used in the present specification, these terms are provided merely for ease of description, and do not constitute any limitation to the present application.

What is claimed is:

1. A positive electrode sheet, comprising:
   a positive electrode current collector; and
   a positive electrode active material layer coated on at least one surface of the positive electrode current collector, wherein the positive electrode active material layer comprises an inner active material layer stacked on a surface of the positive electrode current collector and an outer active material layer stacked on a surface of the inner active material layer;
   wherein:
      the inner active material layer has a three-level pore size distribution: an inner primary pore size distribution from 3 nm to 10 nm, an inner secondary pore size distribution from 10 nm to 100 nm, and an inner tertiary pore size distribution from 0.1 μm to 2 μm; and
      the outer active material layer has a three-level pore size distribution: an outer primary pore size distribution from 0.5 nm to 3 nm, an outer secondary pore size distribution from 10 nm to 100 nm, and an outer tertiary pore size distribution from 0.1 μm to 2 μm.

2. The positive electrode sheet according to claim 1, wherein:
   the inner active material layer comprises an inner conductive agent and an inner active material, and a specific surface area of the inner conductive agent is from 300 m$^2$/g to 1,000 m$^2$/g; and/or
   the outer active material layer comprises an outer conductive agent and an outer active material, and a specific surface area of the outer conductive agent is from 1,000 m$^2$/g to 2,500 m$^2$/g.

3. The positive electrode sheet according to claim 2, wherein:
   a mass ratio of the inner conductive agent to the inner active material is (0.3-2):100; and/or
   a mass ratio of the outer conductive agent to the outer active material is (0.3-3):100.

4. The positive electrode sheet according to claim 2, wherein the inner conductive agent and the outer conductive agent are each independently selected from activated carbon or carbon nanotube.

5. The positive electrode sheet according to claim 1, wherein:
   the inner active material layer comprises an inner first active material and an inner second active material, a particle size distribution of the inner first active material is from 24 nm to 600 nm, and a particle size distribution of the inner second active material is from 0.25 μm to 13 μm; and/or
   the outer active material layer comprises an outer first active material and an outer second active material, a particle size distribution of the outer first active material is from 24 nm to 600 nm, and a particle size distribution of the outer second active material is from 0.25 μm to 13 μm.

6. The positive electrode sheet according to claim 5, wherein:
   a particle size of the inner first active material does not overlap with the inner tertiary pore size; and/or
   a particle size of the outer first active material does not overlap with the outer tertiary pore size.

7. The positive electrode sheet according to claim 5, wherein:
- a mass ratio of the inner first active material to the inner second active material is (0.3-3):1; and/or
- a mass ratio of the outer first active material to the outer second active material is (0.3-3):1.

8. A secondary battery, comprising the positive electrode sheet according to claim 1.

9. A battery module, comprising the secondary battery according to claim 8.

10. A battery pack, comprising the secondary battery according to claim 8.

11. An electrical apparatus, comprising the secondary battery according to claim 8.

* * * * *